Aug. 12, 1924.  
A. T. SAMPSON  
1,505,076  
SYSTEM OF ELECTRICAL INSTALLATION  
Filed April 12, 1923
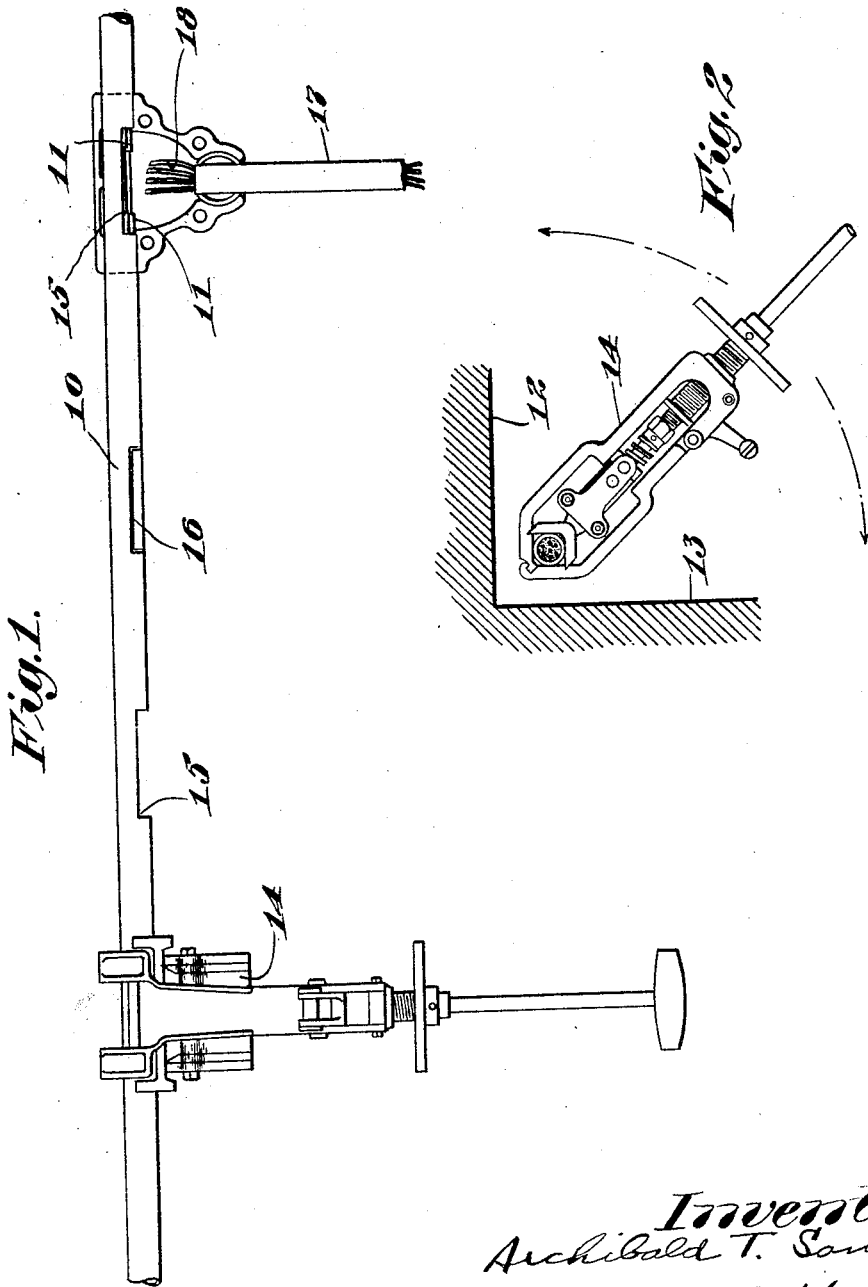
Inventor  
Archibald T. Sampson  
By James R. Hodder  
Attorney Patented Aug. 12, 1924.

1,505,076

UNITED STATES PATENT OFFICE.

ARCHIBALD T. SAMPSON, OF LYNN, MASSACHUSETTS, ASSIGNOR TO SAMPSON AXCESS SYSTEM, INC., OF LYNN, MASSACHUSETTS, A CORPORATION OF MASSACHUSETTS.

SYSTEM OF ELECTRICAL INSTALLATION.

Application filed April 12, 1923. Serial No. 631,571.

*To all whom it may concern:*

Be it known that I, ARCHIBALD T. SAMPSON, a citizen of the United States, and resident of Lynn, in the county of Essex and State of Massachusetts, have invented an Improvement in Systems of Electrical Installation, of which the following description, in connection with the accompanying drawings, is a specification, like letters on the drawings representing like parts.

My present invention relates to an improved system of electrical construction, and more particularly to an improved system of electrical construction wherein provision is made for tapping the main conductors, enclosed within a conduit, at any point in the system without disturbing or removing the conduits.

In the systems of electrical installations for buildings, factories and the like as now employed with the open conduit work, it is customary to have the separate lengths of pipe or conduit cut and threaded together with correspondingly threaded unions and to cut and thread the abutting ends of the conduit at every outlet box and branch, whether switch, cut-out, light or other pendants. This method is both expensive and objectionable, it being almost impossible to line up such fittings satisfactorily and to have them sustain the usual fixtures put upon them, as the continuous cutting and threading of the conduits or pipes greatly weakens the mechanical strength of the same. Furthermore, each time a conduit is cut and threaded, the twisting and turning of the threaded connections loosens the entire line. Wherever current is taken off the main wires of the conduit, it has heretofore been customary to take down the adjacent sections of pipe and cut out the same, thread and apply the threaded outlet box and refit the pipes thus prepared, disalining the entire adjacent piping. My invention obviates all these difficulties and by means of my improved system and apparatus I am enabled to install a system of electrical construction which may be entirely a threadless system, maintaining the conduits or pipes unbroken, except for any slot that may be cut therein, as will be explained, and providing a mechanically strong and unitary construction throughout.

Furthermore, my improved system enables the junction of a conduit and an outlet box to be made without threaded connections, to ensure increased strength at all such joints, and in addition thereto, providing a substantially waterproof, dustproof and perfect electrical bonding of the pipe sections, outlet boxes, branches and the like forming a conduit, so that the same may be used as one element of the electrical circuit, taking the place of the usual return wires now employed. In carrying out the invention of my improved system, I may employ the usual type of outlet boxes now in general use, or may utilize my novel form of outlet boxes and brackets which are specially applicable to my present system. I may also use the customary two-wire circuit now generally employed in the conduit work, similar to that herein explained, or may, and preferably will, so connect and bond the entire piping as to employ it as a return for the circuit. A further feature of the invention consists in my novel arrangement of supporting bracket and outlet box which constitutes a brace for the piping wherever the same is applied thereto, and actually reinforces the conduits instead of weakening them, as in prior systems; and a novel form of extension and supporting arm is preferably used in combination with my combined reinforcing outlet box and bracket.

Further features of the invention, important details of construction and novel arrangements and advantages will be hereinafter more fully pointed out and claimed.

Referring to the drawings illustrating preferred embodiments of the invention and the novel features of construction preferably employed therein, Fig. 1 is a view, on a reduced scale, of a portion of a piping installation, and Fig. 2 is a fragmentary view of a room in a building or like structure showing a conduit in cross section, and mounted in a corner of said room, and with an improved cutting means for cutting slots in the conduit while said conduit is in permanent position in the building.

Referring to the drawings 10 designates a pipe or conduit containing a wire or plurality of wires 11. This conduit 10 is usually installed in a building, such as a factory or other structure, as closely adjacent the ceiling 12 and side or end wall 13 as is practical, passing through the walls from room to room, and carrying the conductors or main leads 11. In such position the conduits 10 are accessible and are also in such a position as not to seriously interfere with shafting, pulleys or belts that may be attached to or suspended from the ceiling. The above mentioned position is the one preferred when installing the system in a building, whether at the time of construction of the building or at any future time, but it is within the scope of my invention to install the conduits in any other position, but always preferably close to the ceiling.

In my Patents, Nos. 1,412,220, granted April 11, 1923, and 1,149,150, granted March 20, 1923, I have described and claimed improved apparatus for cutting slots in a conduit, while the same is installed permanently in a building and in the accompanying drawings I have illustrated at 14 the improved apparatus referred to in Patent No. 1,478,065, granted December 18, 1923, the showing of this apparatus in Fig. 2 illustrating clearly the method of manipulating the same to complete the cutting of a slot when the pipe or conduit 10 is installed in the manner referred to above.

The conduit 10 may be installed in the building with the slots already completed, as shown at 15, or partially completed, as shown at 16, or may be installed without any slots, whether wholly or partially completed. In a new building, it may be advantageous, where the position of the branch leads is predetermined, to cut the slots for such branch leads before installation. In relocating the lights or other fixtures in an installation, the system is preferably installed without any slots. The improved method of installation in which the slots for branch conduits are partially completed prior to installation, is fully described in my Patent 1,452,169 granted April 17, 1923, of which the present application is a continuation, in part. When it is desired to install a branch conduit 17 at any point in the system, the cutting apparatus described in Patents, Nos. 1,412,220 and 1,449,150, are utilized to cut parallel slots at the desired point, after which the apparatus designated at 14 and described in my Patent No. 1,478,065 is employed to cut parallel slots at right angles to the slots above referred to completing the slot. The cutting of this slot exposes the main leads 11 and the branch conductors 18 are spliced thereto in any convenient manner. A ball and socket joint 19 is attached to the main conduit 10, this joint not only enclosing the leads 11 and 18, but also actually strengthening the conduit 10 at such point.

The conduits, both main and branch 10 and 17 respectively, may come in any convenient length, and the various lengths of the main conduits are connected together in the manner referred to in my copending application Ser. No. 344,927 filed Dec. 15, 1910.

While I have described the preferred method of practicing my improved system of installation, somewhat in detail, it is to be understood that I may vary the details of such system within reasonable limits, without departing from the spirit of the invention.

Having thus described my invention, what I claim is—

1. The improved method of electrical installation which consists in providing metallic conduits to receive and carry electric wires, installing said conduits permanently in position in a building, weakening a portion of said conduits at a plurality of desired points along the length thereof without injuring or disturbing the wires within the conduits, whereby the conduits are left intact, the weakened portions at such points constituting, when removed, a portion of an outlet receptacle therefor, then removing the weakened portion at any desired point without injuring or disturbing the wires, then completing the construction of the outlet receptacle at such desired point while the conduit is permanently in position and to lead power from the through wires independently of cutting the same, and then adding means to clamp the outlet receptacle on the conduit at the point from which the weakened portion has been removed.

2. The improved method of electrical installation which consists in providing metallic conduits to receive and carry electric wires, installing said conduits permanently in position in a building, removing a portion of said conduits, while in said permanent position, at any desired point along the length thereof without injuring the wires within the conduit, leaving the conduits intact, attaching an outlet box to the conduit at the point where the portion has been removed, attaching a branch conduit, containing branch wires, to the conduit through the medium of the outlet box, and then connecting the branch wires to the main wires independently of cutting said main wires.

3. The improved method of electrical installation which consists in providing metallic conduits to receive and carry electric wires, installing said wires permanently in position in a building, removing a portion of said conduits, while in said permanent position, at any desired point along the length thereof, leaving the conduits intact, attaching an outlet box to the conduit at the point where the portion has been removed, attaching a branch conduit, containing branch wires, to the conduit through the medium of the outlet box, and then connecting the branch wires to the main wires independently of cutting said main wires.

4. The improved method of electrical installation which consists in providing metallic conduits to receive and carry electric wires, installing said conduits permanently in position in a building, removing a portion of said conduits, while in said permanent position, at any desired point along the length thereof, leaving the conduits intact, and attaching an outlet box to the conduit at the point where the portion has been removed.

In testimony whereof, I have signed my name to this specification.

ARCHIBALD T. SAMPSON.